US009350446B2

(12) United States Patent
Bruno

(10) Patent No.: US 9,350,446 B2
(45) Date of Patent: May 24, 2016

(54) OPTICAL SIGNAL POWER SELECTION AND CONTROL

(75) Inventor: Gianmarco Bruno, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 38 days.

(21) Appl. No.: 13/996,691

(22) PCT Filed: Mar. 15, 2011

(86) PCT No.: PCT/EP2011/053860
§ 371 (c)(1),
(2), (4) Date: Jul. 19, 2013

(87) PCT Pub. No.: WO2012/084271
PCT Pub. Date: Jun. 28, 2012

(65) Prior Publication Data
US 2013/0294763 A1    Nov. 7, 2013

(30) Foreign Application Priority Data

Dec. 22, 2010    (EP) .................................... 10196614

(51) Int. Cl.
H04B 10/073    (2013.01)
H04B 10/077    (2013.01)
H04B 10/564    (2013.01)

(52) U.S. Cl.
CPC .......... *H04B 10/073* (2013.01); *H04B 10/0775* (2013.01); *H04B 10/564* (2013.01)

(58) Field of Classification Search
CPC ............. H04B 10/073–10/077; H04B 10/0779
See application file for complete search history.

(56) References Cited

U.S. PATENT DOCUMENTS

| 6,580,531 B1 * | 6/2003 | Swanson et al. ................... 398/5 |
| 6,591,047 B2 | 7/2003 | Malomed et al. |
| 6,771,904 B1 * | 8/2004 | Sasaki et al. ..................... 398/25 |

(Continued)

FOREIGN PATENT DOCUMENTS

EP    1916784 A1    4/2008

OTHER PUBLICATIONS

Ip, E., et al., "Compensation of Dispersion and Nonlinear Impairments Using Digital Backpropagation", Journal of Lightwave Technology, vol. 26, No. 20, Oct. 15, 2008, pp. 3416-3425.

*Primary Examiner* — David Payne
*Assistant Examiner* — Casey Kretzer
(74) *Attorney, Agent, or Firm* — Rothwell, Figg, Ernst & Manbeck, P.C.

(57) ABSTRACT

A method (10) of selecting an optical signal power for an optical signal carrying traffic encoded on the optical signal in a modulation format. The optical signal is for transmission across an optical path in an optical communications system. The method (10) comprises: a. providing a probe optical signal at a probe signal power (12). The probe optical signal carries test traffic encoded on the probe optical signal in said modulation format (14). b. transmitting the probe optical signal across the optical path (16); and c. receiving the probe optical signal at an end of the optical path (18) and measuring an indicator of the quality of the received probe optical signal (20). The method comprises implementing steps a. to c. for each of a plurality of different probe signal powers (22, 26). The method further comprises selecting an indicator value corresponding to a quality above a threshold quality (24) and selecting an optical signal power substantially the same as the respective probe signal power as the optical signal power for the optical signal (28).

18 Claims, 13 Drawing Sheets

(56) References Cited

U.S. PATENT DOCUMENTS

| | | |
|---|---|---|
| 7,756,421 B2 | 7/2010 | Roberts et al. |
| 2002/0118783 A1* | 8/2002 | Cripps et al. ............... 375/347 |
| 2004/0037569 A1* | 2/2004 | Kamalov et al. ............ 398/162 |
| 2004/0190899 A1 | 9/2004 | Torii et al. |
| 2007/0036084 A1* | 2/2007 | Lindsay et al. ............. 370/246 |
| 2008/0226288 A1* | 9/2008 | Miller ............................ 398/9 |
| 2008/0232760 A1 | 9/2008 | Xia |
| 2010/0021183 A1* | 1/2010 | Olson et al. ................ 398/193 |

\* cited by examiner

OPTICAL SIGNAL POWER SELECTION AND CONTROL

CROSS-REFERENCE TO RELATED APPLICATIONS

This application is a 35 U.S.C. §371 National Phase Entry Application from PCT/EP2011/053860, filed Mar. 15, 2011, and designating the United States, which claims priority to European Application No. 10196614.1, filed Dec. 22, 2010. The above-mentioned applications are incorporated by reference herein.

TECHNICAL FIELD

The invention relates to a method of selecting an optical signal power for an optical signal carrying traffic encoded on the optical signal in a modulation format, the optical signal to be transmitted across an optical path in an optical communications system. The invention further relates to a method of controlling an optical signal power for an optical signal carrying traffic encoded on the optical signal in a modulation format, the optical signal to be transmitted across an optical path in an optical communications system. The invention further relates to an optical signal power selection system. The invention further relates to an optical signal transmission apparatus.

BACKGROUND

Optical communication systems operate by transmitting a modulated laser signal over a span of optical fibre before detection of the signal at a receiver. If the optical signal is too weak to be detected at the receiver, optical amplification can be used to boost the power of the signal and hence compensate for the loss of the fibre span. However, this amplification adds noise onto the optical signal and thus degrades the optical signal to noise ratio (OSNR). If the number of spans and amplification stages is large before receiving then the OSNR can be degraded to such an extent that the signal is difficult to recover. This is exacerbated at high data rates. One way of overcoming this degradation is to simply boost the signal power at the transmitter and at the start of every subsequent fibre span. At low signal powers in what is known as the 'linear regime' of the fibre this is possible and accordingly boosts the OSNR and hence improves the received signal quality. However, there exists a signal power threshold at which increased optical power can actually cause degradation in the signal quality even though the OSNR is still improving. This is known as the nonlinear threshold and the regime above this power known as the 'nonlinear regime' of the fibre.

Techniques exist for mitigating the nonlinear degradation of an optical signal in often complex and expensive ways. For example US 2004/0197103A1 discloses a technique for pre-distorting a signal before transmission in order to take into account the effect of the nonlinearities and dispersion of the fibre, so that after these effects have occurred on the signal during its passage through the fibre, the original signal has been recovered. This technique requires high speed electronics in order to operate at the high signal data rates involved, and is hence expensive. It also requires details of the configuration of the optical path across which the optical signal is to be transmitted.

SUMMARY

It is an object to provide an improved method of selecting an optical signal power for an optical signal carrying traffic encoded on the optical signal in a modulation format, the optical signal to be transmitted across an optical path in an optical communications system. It is a further object to provide an improved method of controlling an optical signal power for an optical signal carrying traffic encoded on the optical signal in a modulation format, the optical signal to be transmitted across an optical path in an optical communications system. It is a further object to provide an improved optical signal power selection system. It is a further object to provide an improved optical signal transmission apparatus.

A first aspect of the invention provides a method of selecting an optical signal power for an optical signal carrying traffic encoded on the optical signal in a modulation format. The optical signal is for transmission across an optical path in an optical communications system. The method comprises:
 a. providing a probe optical signal at a probe signal power. The probe optical signal carries test traffic encoded on the probe optical signal in said modulation format.
 b. transmitting the probe optical signal across the optical path; and
 c. receiving the probe optical signal at an end of the optical path and measuring an indicator of the quality of the received probe optical signal.

The method comprises implementing steps a. to c. for each of a plurality of different probe signal powers. The method further comprises selecting an indicator value corresponding to a quality above a threshold quality and selecting an optical signal power substantially the same as the respective probe signal power as the optical signal power for the optical signal.

The method may enable an optimal optical signal power to be selected for an optical signal for transmitting traffic across an optical path in an optical communications system. This may enable the reach of an optical signal to be extended and may reduce optical signal degradation due to nonlinear interaction between the optical signal and an optical transmission fibre during transmission of the optical signal. The method may enable an optical signal power to be selected which may optimise the transmission performance of an optical signal without requiring detailed knowledge of the optical configuration of the optical path across which the optical signal is to be transmitted.

In an embodiment traffic is encoded on the optical signal at a first bit rate, and test traffic is encoded on the probe optical signal at substantially the same bit rate. This may enable the probe optical signal to be generated from the same optical source as the optical signal.

In an embodiment, traffic is encoded on the optical signal at a first bit rate, and test traffic is encoded on the probe optical signal at a second, lower bit rate. This may enable the probe optical signal to be generated using a less expensive optical source than is required to generate the optical signal.

In an embodiment, the second bit rate is not greater than one quarter of the first bit rate.

In an embodiment the probe optical signal has an optical signal to noise ratio and the method further comprises adding a noise signal to the probe optical signal. The noise signal is arranged to reduce the optical signal to noise ratio. This may enable a difference in propagation penalties suffered by the probe optical signal as compared to the optical signal to be taken into account. This may enable error counting to be performed on the probe optical signal within an operationally acceptable time period.

In an embodiment, the noise signal is arranged to reduce the optical signal to noise ratio in dependence on a ratio of the first bit rate to the second bit rate. This may enable the quality of the probe optical signal to be reduced to that of the optical signal.

In an embodiment, the noise signal is arranged to reduce the optical signal to noise ratio of the probe optical signal by a factor M in dependence on a ratio of the optical signal bit rate $R_{signal}$ the probe optical signal bit rate $R_{probe}$, according to the equation:

$$M = 10 \cdot \log \frac{R_{signal}}{R_{probe}}$$

This may enable the quality of the probe optical signal to be reduced to that of the optical signal.

In an embodiment for each probe signal power, the method further comprises step d. comprising obtaining an optical signal power correction factor in dependence on the respective measured indicator value. Step d further comprises calculating a corrected probe signal power comprising the probe signal power modified by the correction factor. The optical signal power for the optical signal is selected by selecting an indicator value corresponding to a quality above the threshold quality. An optical signal power substantially the same as the respective corrected probe signal power is then selected as the optical signal power for the optical signal. This may enable the correction of second order effects such as oscillator phase noise and quantization errors which can affect higher bit rate signals differently to lower bit rate signals.

In an embodiment, the method further comprises obtaining an optical signal power correction factor for the optical signal power. The optical signal power correction factor depends on the respective measured indicator value. The method further comprises calculating a corrected optical signal power comprising the optical signal power modified by the correction factor. This may enable the correction of second order effects such as oscillator phase noise and quantization errors which can affect higher bit rate signals differently to lower bit rate signals.

In an embodiment, the indicator value corresponding to the highest quality is selected. This may enable an optimal optical signal power to be selected.

In an embodiment, the indicator of quality comprises one of bit error rate and Q-factor of the probe optical signal. In an embodiment, the lowest bit error rate value is selected. In an embodiment, the highest Q-factor is selected. In an embodiment, the lowest bit error rate value is selected by generating a plot of bit error rate a function of probe optical signal power and identifying the lowest bit error rate value on the plot. In an embodiment, the highest Q-factor is selected by generating a plot of Q-factor as a function of probe optical signal power and identifying the highest Q-factor on the plot.

In an embodiment, the optical signal power correction factor for a probe optical signal power is dependent on the modulation format. The correction factor may therefore be selected to take account of different transmission impairments suffered by different modulation formats.

In an embodiment, the probe optical signal wavelength is substantially the same as the optical signal wavelength.

A second aspect of the invention provides a method of controlling an optical signal power for an optical signal carrying traffic encoded on the optical signal in a modulation format. The optical signal is to be transmitted across an optical path in an optical communications system. The method comprises selecting an optical signal power for the optical signal using any of the above steps of the method of setting an optical signal power. The method further comprises generating and transmitting a control signal indicative of the selected optical signal power.

This may enable an optimal optical signal power to be selected and set for an optical signal to transmit traffic across an optical path in an optical communications system. This may enable the reach of an optical signal to be extended and may reduce optical signal degradation due to nonlinear interaction between the optical signal and an optical transmission fibre during transmission of the optical signal. The method may enable an optical signal power to be set which may optimise the transmission performance of an optical signal without requiring detailed knowledge of the optical configuration of the optical path across which the optical signal is to be transmitted.

In an embodiment, the method further comprises receiving the control signal and transmitting an optical signal at the selected optical signal power.

A third aspect of the invention provides an optical signal power selection system comprising probe optical signal transmission apparatus, probe optical signal receiver apparatus and a controller. The probe optical signal transmission apparatus comprises an optical output and a probe optical signal generation apparatus. The optical output is arranged to deliver a probe optical signal to an optical path of an optical communications system. The optical path is arranged for transmission of an optical signal carrying traffic encoded on the optical signal in a modulation format. The probe optical signal generation apparatus is arranged to provide a probe optical signal to the optical output. The probe optical signal generation apparatus is further arranged to provide the probe optical signal at each of a plurality of different probe signal powers. The probe optical signal carries test traffic encoded on said probe optical signal in said modulation format. The probe optical signal receiver apparatus comprises a probe optical signal interrogation apparatus arranged to receive the probe optical signal following transmission over the optical path. The probe optical signal receiver apparatus is further arranged to measure an indicator of the quality of the received probe optical signal at each said probe signal power. The controller is arranged to: receive each measured indicator value; select an indicator value corresponding to a quality above a threshold quality; and select an optical signal power substantially the same as the respective probe signal power as the optical signal power for the optical signal.

The system may enable an optimal optical signal power to be selected for an optical signal for transmitting traffic across an optical path in an optical communications system. This may enable the reach of an optical signal to be extended and may reduce optical signal degradation due to nonlinear interaction between the optical signal and an optical transmission fibre during transmission of the optical signal. The system may enable an optical signal power to be selected which may optimise the transmission performance of an optical signal without requiring detailed knowledge of the optical configuration of the optical path across which the optical signal is to be transmitted.

In an embodiment, traffic is encoded on the optical signal at a first bit rate, and the probe optical signal generation apparatus is arranged to encode test traffic on the probe optical signal at substantially the same bit rate. This may enable the optical source for the optical signal to be used as the probe optical signal generation apparatus.

In an embodiment, the optical path is arranged for transmission of an optical signal carrying traffic encoded at a first bit rate. The probe optical signal generation apparatus is arranged to encode test traffic on the probe optical signal at a second, lower bit rate. This may enable the probe optical signal to be generated using a less expensive optical source than is required to generate the optical signal and the components of the system may have less stringent requirements in terms of bandwidth, sampling speed and processing speed than if using the same bit rate as the optical signal. This may also enable the probe optical signal bit rate to be varied. This may also enable the modulation format used with the probe optical signal to be changed, thereby enabling the system to be used to select an optical signal power for optical signals having traffic encoded on them in different modulation formats.

In an embodiment the second bit rate is not greater than one quarter of the first bit rate.

In an embodiment the probe optical signal has an optical signal to noise ratio and the probe optical signal generation apparatus comprises a noise signal generator arranged to generate a noise signal arranged to reduce the optical signal to noise ratio. The probe optical signal generation apparatus is further arranged to apply the noise signal to the probe optical signal prior to providing the probe optical signal to the optical output. This may enable a difference in propagation penalties suffered by the probe optical signal as compared to the optical signal to be taken into account. This may enable error counting to be performed on the probe optical signal within an operationally acceptable time period. In an embodiment the probe optical signal has an optical signal to noise ratio and the probe optical signal receiver apparatus comprises a noise signal generator arranged to generate a noise signal arranged to reduce the optical signal to noise ratio. The probe optical signal receiver apparatus is further arranged to apply the noise signal to the received probe optical signal prior to measuring the indicator of the quality of the received probe optical signal for each said probe signal power. This may enable a difference in propagation penalties suffered by the probe optical signal as compared to the optical signal to be taken into account. This may enable error counting to be performed on the probe optical signal within an operationally acceptable time period.

In an embodiment the noise signal is arranged to reduce the optical signal to noise ratio in dependence on a ratio of the first bit rate to the second bit rate. This may enable the quality of the probe optical signal to be reduced to that of the optical signal.

In an embodiment, the noise signal is arranged to reduce the optical signal to noise ratio of the probe optical signal by a factor M in dependence on a ratio of the optical signal bit rate $R_{signal}$ to the probe optical signal bit rate $R_{probe}$, according to the equation:

$$M = 10 \cdot \log \frac{R_{signal}}{R_{probe}}$$

This may enable the quality of the probe optical signal to be reduced to that of the optical signal.

In an embodiment the probe optical signal interrogation apparatus is further arranged to, for each probe signal power, obtain an optical signal power correction factor in dependence on the respective measured indicator value. The probe optical signal interrogation apparatus is further arranged to calculate a corrected probe signal power comprising the probe signal power modified by the correction factor. The controller is arranged to select the optical signal power for the optical signal by selecting an indicator value corresponding to a quality above the threshold quality and selecting an optical signal power substantially the same as the respective corrected probe signal power as the optical signal power for the optical signal. This may enable the correction of second order effects such as oscillator phase noise and quantization errors which can affect higher bit rate signals differently to lower bit rate signals.

In an embodiment the controller is further arranged to obtain an optical signal power correction factor in dependence on the respective measured indicator value and calculate a corrected optical signal power comprising the optical signal power modified by the correction factor. This may enable the correction of second order effects such as oscillator phase noise and quantization errors which can affect higher bit rate signals differently to lower bit rate signals.

In an embodiment the probe optical signal interrogation apparatus is arranged to select the indicator value corresponding to the highest quality. This may enable an optimal optical signal power to be selected.

In an embodiment, the indicator of quality comprises one of bit error rate and Q-factor of the probe optical signal. In an embodiment, the lowest bit error rate value is selected. In an embodiment, the highest Q-factor is selected. In an embodiment, the lowest bit error rate value is selected by generating a plot of bit error rate a function of probe optical signal power and identifying the lowest bit error rate value on the plot. In an embodiment, the highest Q-factor is selected by generating a plot of Q-factor as a function of probe optical signal power and identifying the highest Q-factor on the plot.

In an embodiment, the optical signal power correction factor for a probe optical signal power is dependent on the modulation format. The correction factor may therefore be selected to take account of different transmission impairments suffered by different modulation formats.

In an embodiment, the probe optical signal wavelength is substantially the same as the optical signal wavelength.

A fourth aspect of the invention provides an optical signal transmission apparatus comprising an optical signal power selection system and an optical transmitter. The optical signal power selection system is as described above, wherein the controller is further arranged to generate and transmit a control signal indicative of the selected optical signal power. The optical transmitter is arranged to generate and transmit an optical signal carrying traffic encoded on the optical signal in a modulation format. The optical transmitter is further arranged to receive said control signal and to generate and transmit the optical signal at the selected optical signal power. The system may enable an optimal optical signal power to be set for an optical signal for transmitting traffic across an optical path in an optical communications system. This may enable the reach of an optical signal to be extended and may reduce optical signal degradation due to nonlinear interaction between the optical signal and an optical transmission fibre during transmission of the optical signal. The system may enable an optical signal power to be set which may optimise the transmission performance of an optical signal without requiring detailed knowledge of the optical configuration of the optical path across which the optical signal is to be transmitted.

A fifth aspect of the invention provides a data carrier having computer readable instructions embodied therein. The said computer readable instructions are for providing access to resources available on a processor. The computer readable instructions comprise instructions to cause the processor to perform any of the above steps of the method of selecting an optical signal power for an optical signal carrying traffic encoded on the optical signal in a modulation format. The optical signal being for transmission across an optical path in an optical communications system.

A sixth aspect of the invention provides a data carrier having computer readable instructions embodied therein. The said computer readable instructions are for providing access to resources available on a processor. The computer readable instructions comprise instructions to cause the processor to perform any of the above steps of the method a method of controlling an optical signal power for an optical signal carrying traffic encoded on the optical signal in a modulation format. The optical signal is to be transmitted across an optical path in an optical communications system.

Embodiments of the invention will now be described, by way of example only, with reference to the accompanying drawings.

DETAILED DESCRIPTION

Figure 1:
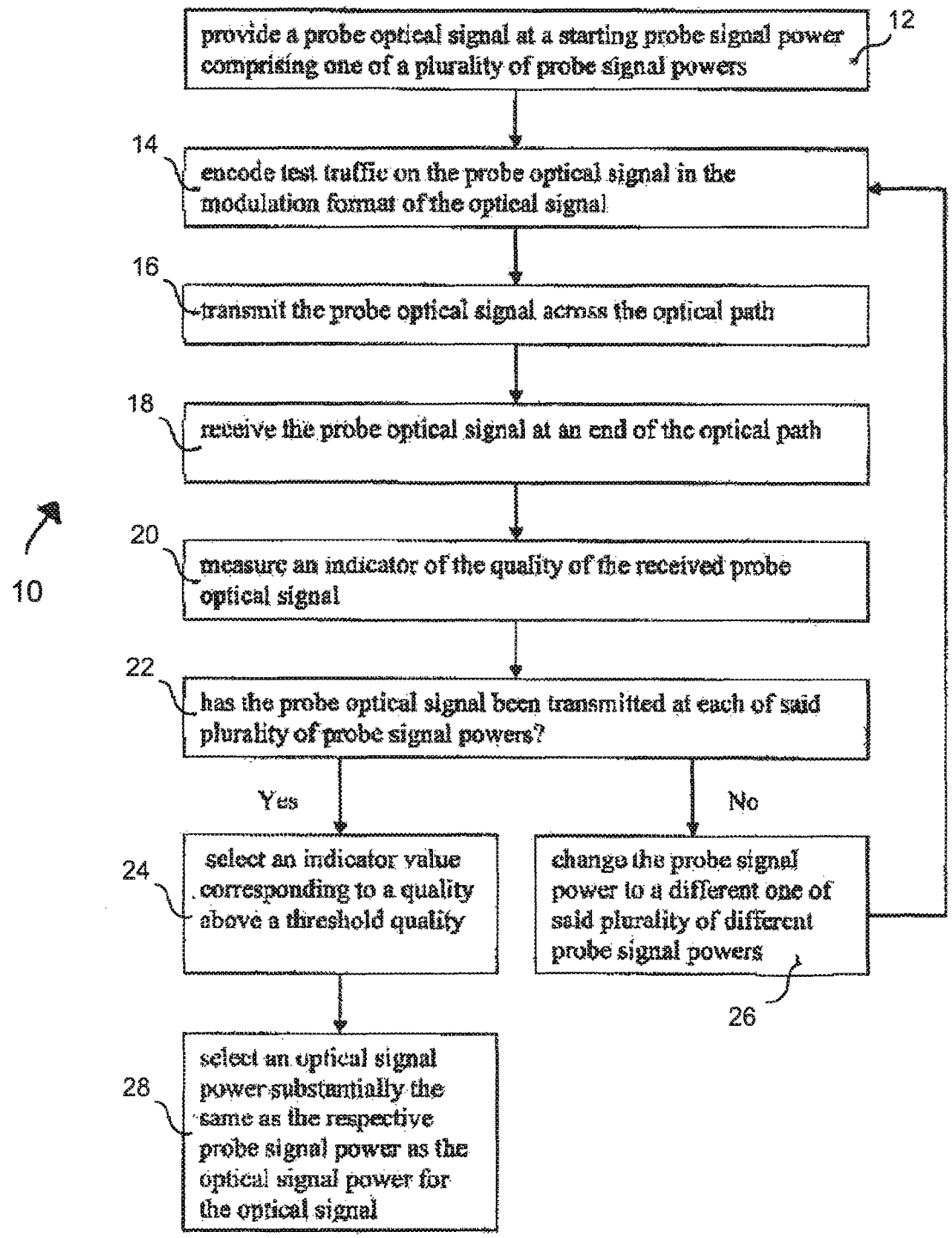
FIG. 1 is a flow chart of the steps of a method of selecting an optical signal power for an optical signal carrying traffic encoded on the optical signal in a modulation format, according to a first embodiment of the invention.

Referring to FIG. 1, a first embodiment of the invention provides a method 10 of selecting an optical signal power for an optical signal carrying traffic encoded on the optical signal in a modulation format. The optical signal is for transmission across an optical path in an optical communications system. The method 10 comprises:

a. providing a probe optical signal at a probe signal power 12. The probe optical signal carries test traffic which is encoded on it in said modulation format 14.

b. transmitting the probe optical signal across the optical path 16; and c. receiving the probe optical signal at an end of the optical path 18 and measuring an indicator of the quality of the received probe optical signal 20.

Steps a. to c. are implemented for each of a plurality of different probe signal powers 22, 26. Following implementation of steps a. to c. for each said probe signal power, the method comprises selecting an indicator value corresponding to a quality above a threshold quality 24. An optical signal power substantially the same as the probe signal power corresponding to the selected indicator value is selected as the optical signal power for the optical signal 28.

Figure 2:
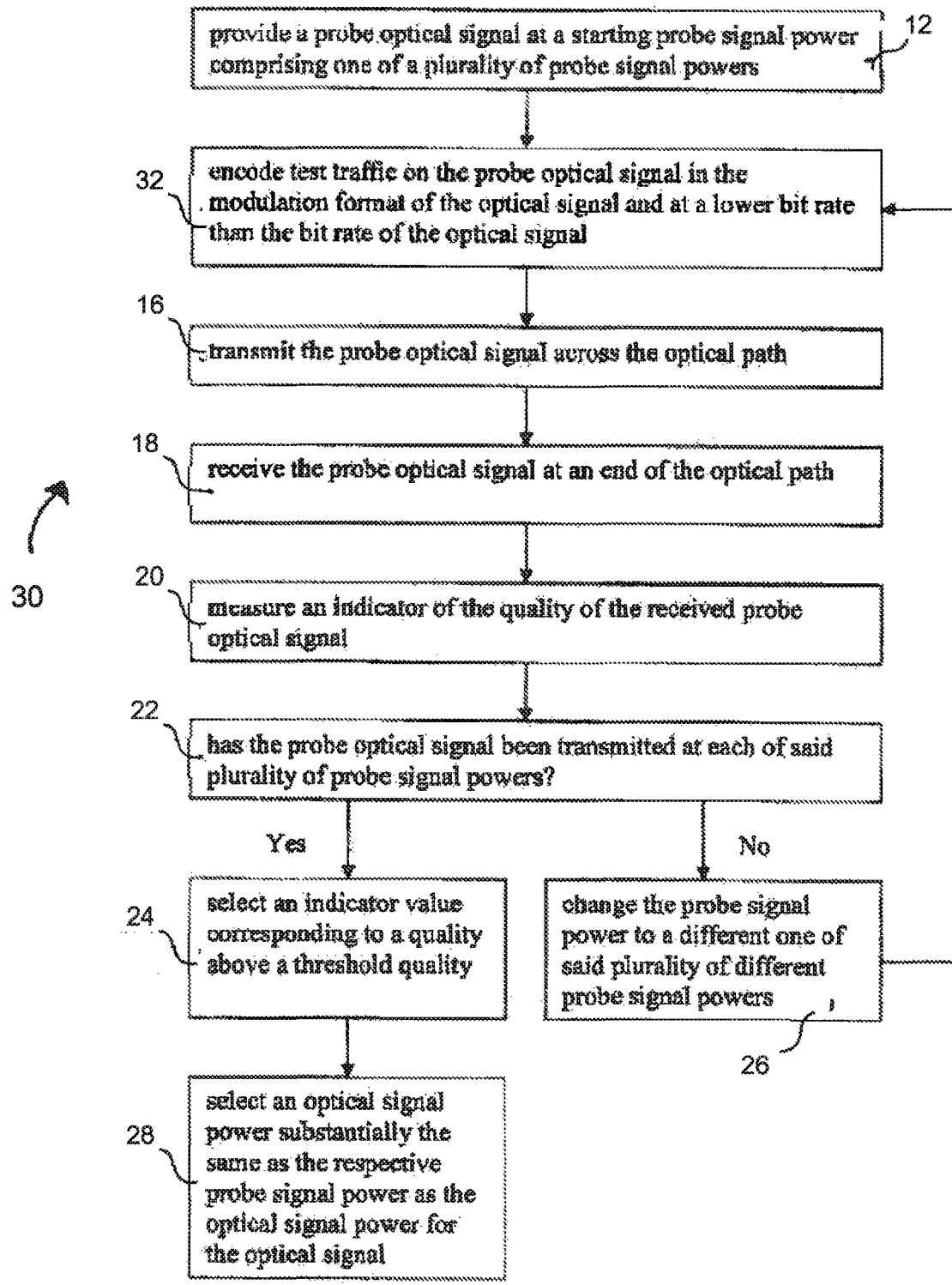
FIG. 2 is a flow chart of the steps of a method of selecting an optical signal power for an optical signal carrying traffic encoded on the optical signal in a modulation format, according to a second embodiment of the invention.

A second embodiment of the invention provides a method 30 of selecting an optical signal power for an optical signal carrying traffic encoded on the optical signal in a modulation format. The steps of the method 30 of this embodiment are shown in FIG. 2. The method 30 of this embodiment is similar to the method 10 of FIG. 1, with the following modifications. The same reference numbers are retained for corresponding steps.

In this embodiment, the optical signal will carry traffic encoded on it at a first bit rate. The test traffic is encoded on the probe optical signal at a lower bit rate than the bit rate of the traffic to be encoded on the optical signal 32.

The bit rate of the test traffic may be much lower than the bit rate of the traffic to be encoded on the optical signal. For example, where the optical signal is to carry traffic at 40 Gbit/s, 100 Gbit/s, 400 Gbit/s or higher the test traffic may have a bit rate of 10 Gbit/s or less. A much lower bit rate may be used for the test traffic because the nonlinear tolerance of an optical signal encoded with a given modulation format and received with coherent detection is approximately independent of the bit-rate. Using a lower bit rate for the test traffic is advantageous because at lower bit rates optical and electrical components usually have less stringent operating requirements, for example in terms of bandwidth, sampling speed and processing speed.

Figure 3:
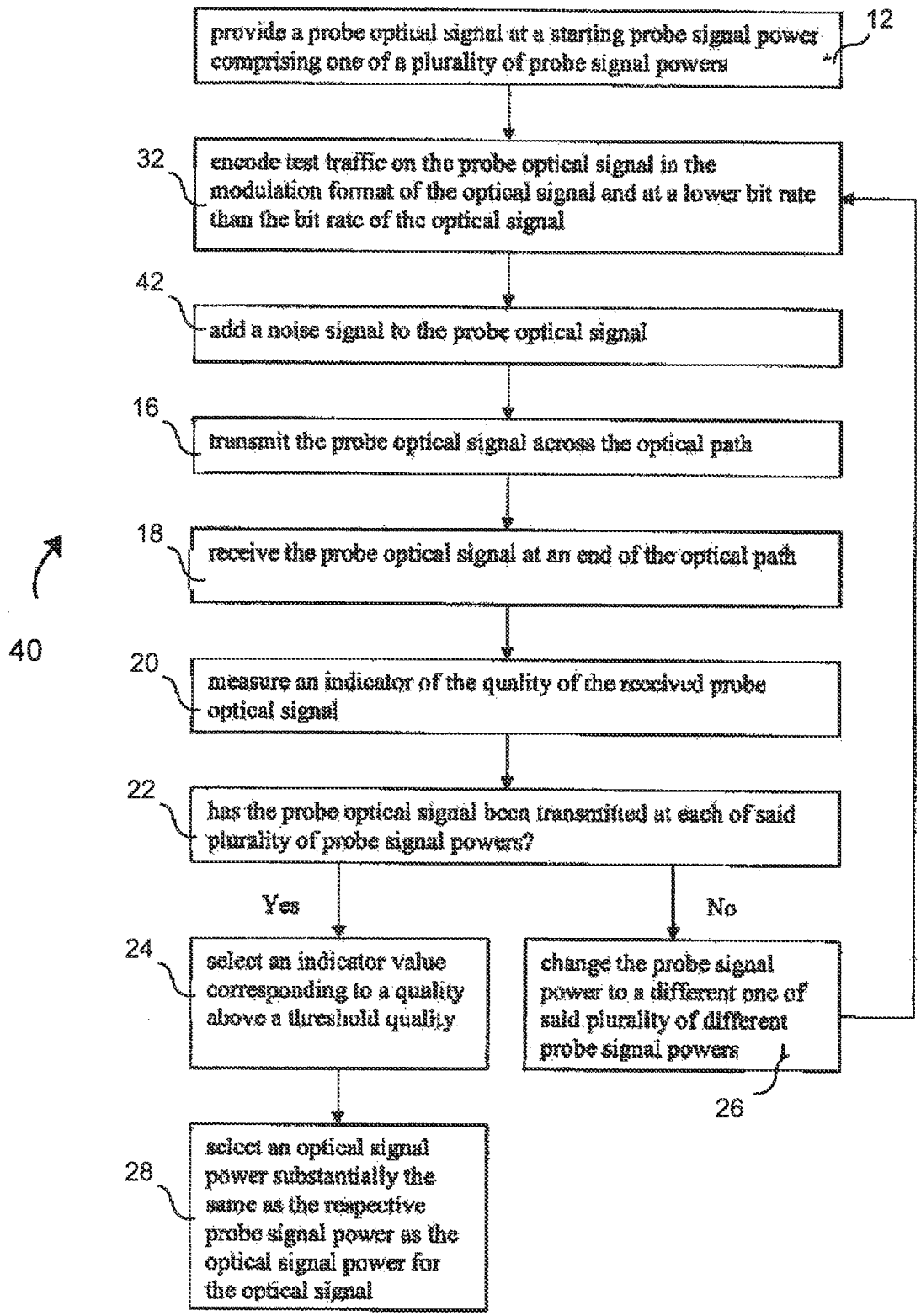
FIG. 3 is a flow chart of the steps of a method of selecting an optical signal power for an optical signal carrying traffic encoded on the optical signal in a modulation format, according to a third embodiment of the invention.

The steps of a method 40 of selecting an optical signal power for an optical signal carrying traffic encoded on the optical signal in a modulation format according to a third embodiment of the invention are shown in FIG. 3. The method 40 of this embodiment is similar to the method 30 of FIG. 2, with the following modifications. The same reference numbers are retained for corresponding steps.

The probe optical signal has an optical signal to noise ratio (OSNR). In this embodiment, the method further comprises adding a noise signal to the probe optical signal 42. The noise signal is arranged to reduce the OSNR of the probe optical signal.

Optical signals which carry traffic have a bit error rate (BER). The noise signal is added to the probe optical signal in order to give the probe optical signal the same reference BER as the optical signal is expected to have. A reference BER will be understood to mean the BER level that can be properly corrected for in a communications system using forward error correction (FEC). In this embodiment, the reference BER is set to $10^{-3}$. Propagation penalties suffered by an optical signal during transmission are usually higher for lower BER. Modifying the OSNR of the probe optical signal to have the same BER as the optical signal is advantageous because it enables the propagation penalties suffered by the probe optical signal to more closely match those expected to be suffered by the optical signal, so that the indicator of quality measured on the probe optical signal more accurately reflects that which would be measured on the optical signal.

Adding a noise signal is also advantageous in that it makes error counting on the probe signal practical. If the probe optical signal OSNR was not intentionally degraded by optical noise, error counting could be unfeasible because the BER would be orders of magnitude lower thanks to reduced bit-rate and the time necessary to make a statistically meaningful BER estimate would be impractically long. Example for an ideal DP-QPSK modulation format with differential encoding, a BER of $10^{31.3}$ is obtained for an OSNR of 14.4 dB at a bit rate of 125.6 Gbit/s. The same OSNR corresponds to a BER of $10^{-29}$ for a bit rate of 10.7 Gbit/s. At this BER it would take years to make an accurate estimate of the BER.

In this embodiment, the noise signal is arranged to reduce the OSNR of the probe optical signal in dependence on a ratio of the bit rate of the optical signal, $R_{traffic}$, to the bit rate of the probe optical signal, $R_{probe}$. The desired OSNR reduction, M, to be induced by the addition of noise is given by:

$$M = 10 \cdot \log \frac{R_{signal}}{R_{probe}}$$

In this embodiment, the noise signal is added 42 prior to transmission of the probe optical signal.

Figure 4:
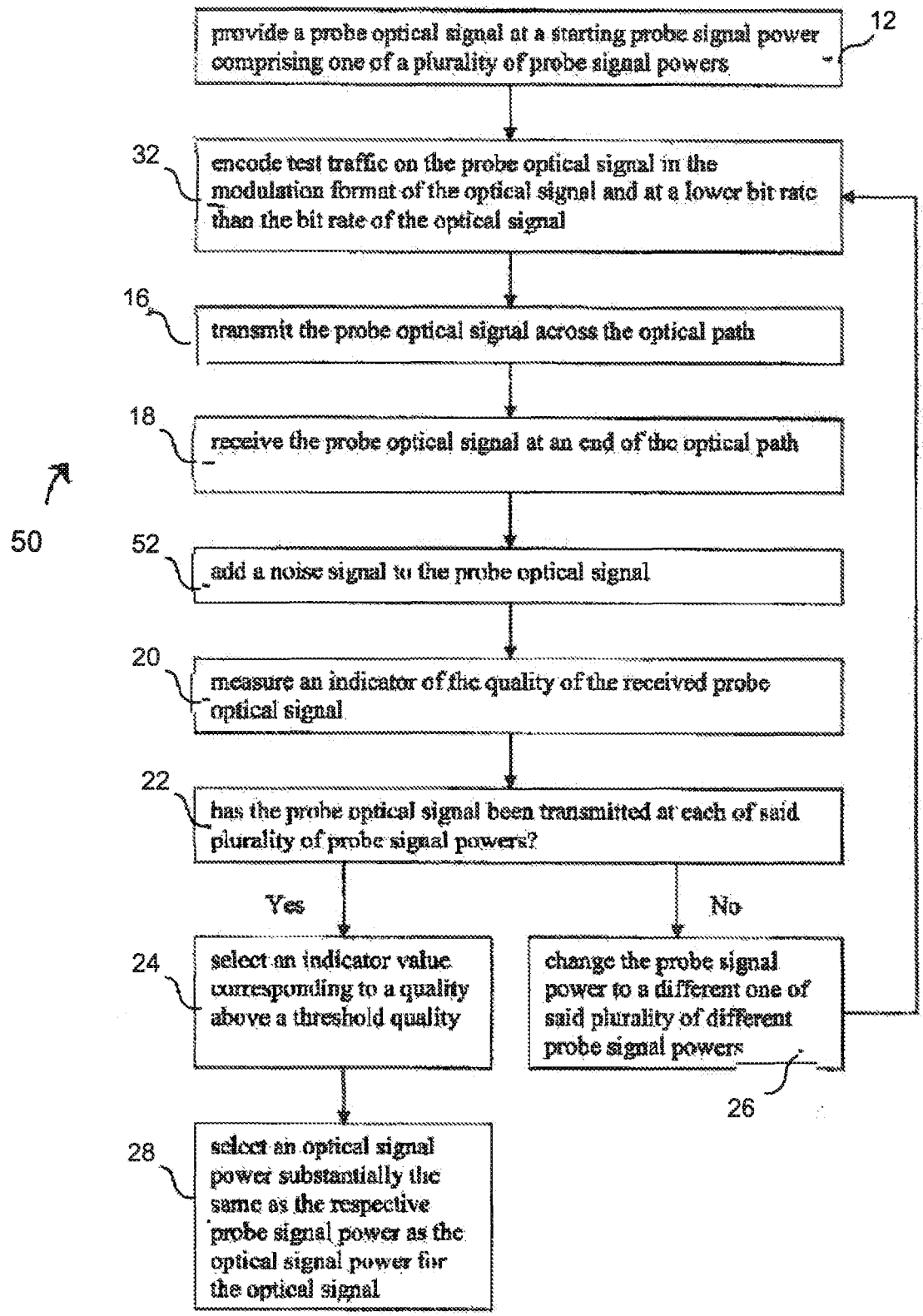
FIG. 4 is a flow chart of the steps of a method of selecting an optical signal power for an optical signal carrying traffic encoded on the optical signal in a modulation format, according to a fourth embodiment of the invention.

The steps of a method 50 of selecting an optical signal power for an optical signal carrying traffic encoded on the optical signal in a modulation format according to a fourth embodiment of the invention are shown in FIG. 4. The method 50 of this embodiment is similar to the method 40 of FIG. 3, with the following modifications. The same reference numbers are retained for corresponding steps.

In this embodiment, the noise signal is added 52 after transmission of the probe optical signal.

When an optical communications system is operating in a linear regime, adding the optical noise at the transmit side or receive side has the same effect. When operating in a nonlinear regime, signal/noise interaction may be different depending on whether the noise signal is added at the transmit side or the receive side because of nonlinear mixing between the probe optical signal and the noise signal.

Figure 5:
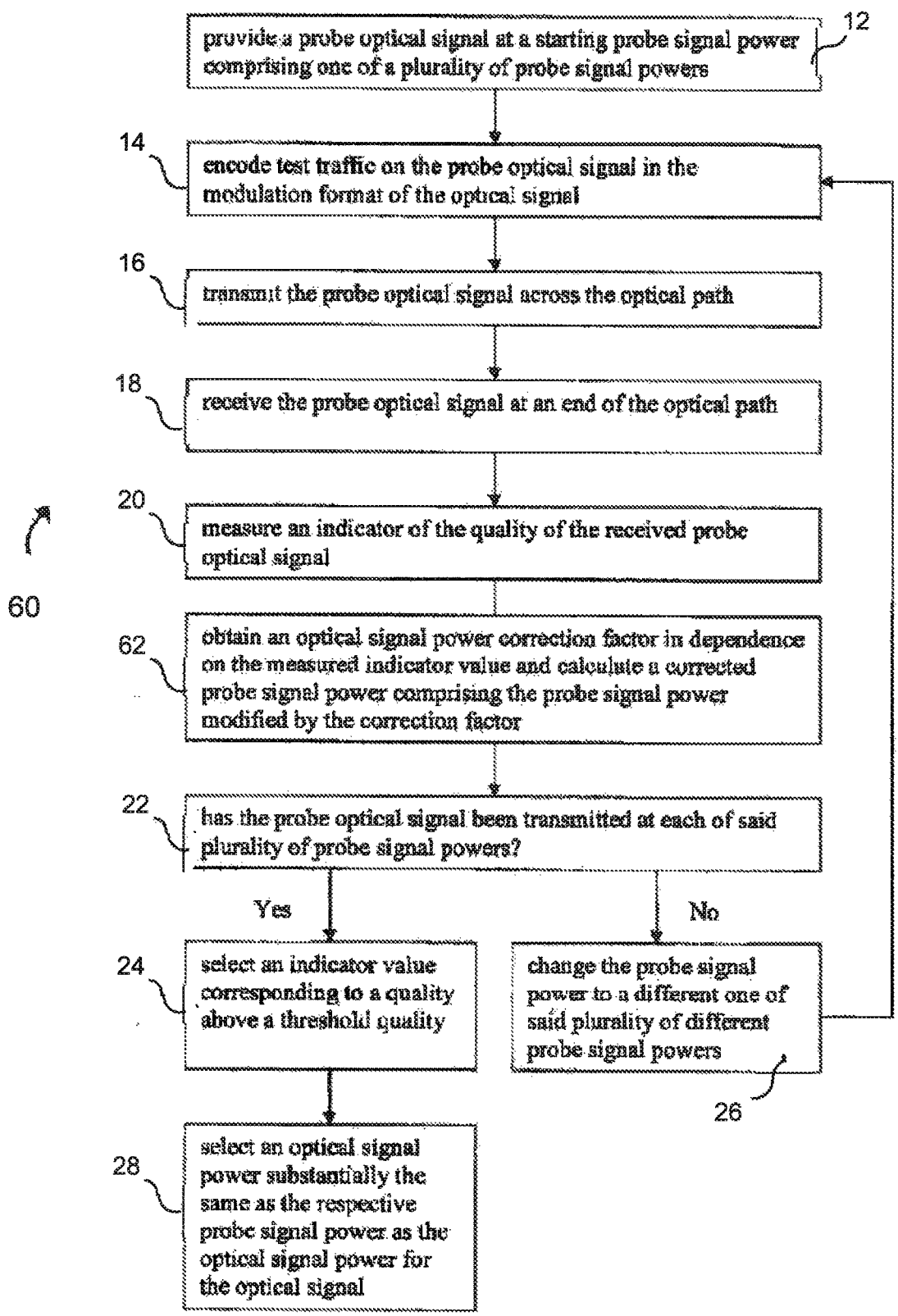
FIG. 5 is a flow chart of the steps of a method of selecting an optical signal power for an optical signal carrying traffic encoded on the optical signal in a modulation format, according to a fifth embodiment of the invention.

A fifth embodiment of the invention provides a method 60 of selecting an optical signal power for an optical signal carrying traffic encoded on the optical signal in a modulation format. The steps of the method 60 of this embodiment are shown in FIG. 5.

The method 60 of this embodiment is similar to the method 10 of FIG. 1, with the following modifications. The same reference numbers are retained for corresponding steps.

In this embodiment, the method further comprises implementing a further step, step d., for each probe signal power 62. Step d. comprises obtaining an optical signal power correction factor in dependence on the respective measured indicator value. Step d. further comprises calculating a corrected probe signal power comprising the probe signal power modified by the correction factor.

The addition of a noise signal provided in the previous embodiment can be regarded as a first-order correction in the method of selecting an optical signal power. Applying the correction factor takes into account deviations in the optical signal power selected due to known effects, like oscillator phase noise, quantization errors, which affect the probe optical signal. While these effects can be corrected for using known algorithms following receipt of an optical signal, these algorithms perform better at lower bit rates, and therefore perform better on the probe optical signal than on the optical signal to be transmitted. Applying the correction factor takes the poorer performance of the algorithms on the optical signal into account.

The correction factor may be obtained from a look-up table containing a respective correction factor for each measured indicator value. A different set of correction factors may be provided for each modulation format which may be used, since the propagation penalties suffered by an optical signal depend upon the modulation format.

Alternatively, the probe optical signal power can be corrected by applying a correction factor in the form of an algorithm. The algorithm may be obtained by plotting theoretically modelled values of optimal optical signal power against optimal probe signal power. The modelled optimal optical signal power is the optical signal power having the lowest BER or highest effective Q-factor for a selected optical path across an optical communications system, taking into account propagation penalties for the path. The optimal probe signal power is modelled by applying the method of the present invention to identify the indicator value corresponding to the highest quality and selecting the corresponding probe signal power, which does not take into account propagation penalties of the path. The algorithm is then obtained by applying a best-fit polynomial to the plotted values, and gives an indication of whether the optical signal power selected using the method of the present invention is an over estimate or an underestimate of the optimal optical signal power. Applying the algorithm to probe signal powers while implementing the method 60 of this embodiment thereby corrects for any such over or under estimation of the optical signal power.

An optical signal power substantially the same as the respective corrected probe signal power is selected as the optical signal power for the optical signal.

Figure 6:
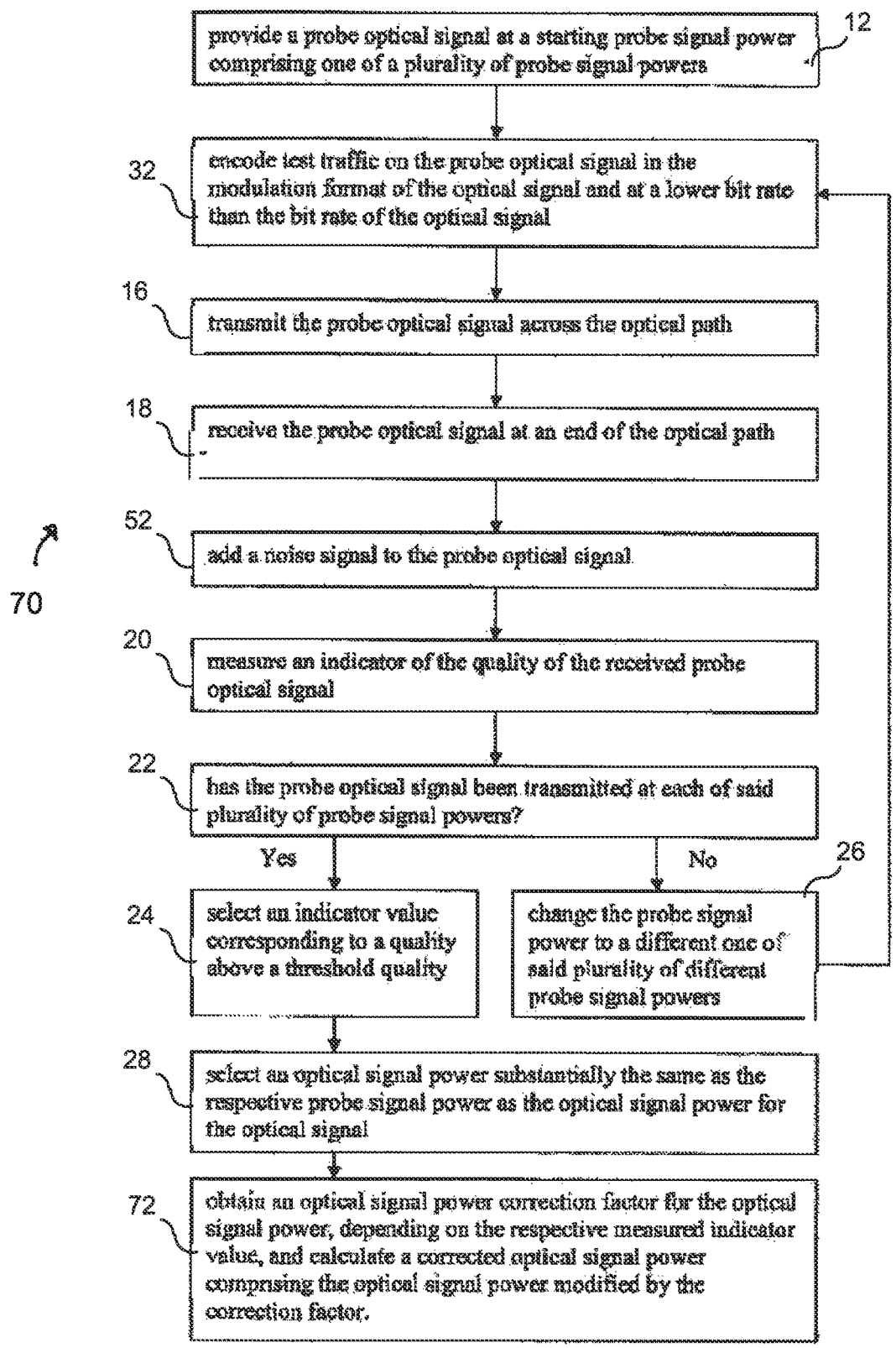
FIG. 6 is a flow chart of the steps of a method of selecting an optical signal power for an optical signal carrying traffic encoded on the optical signal in a modulation format, according to a sixth embodiment of the invention.

A sixth embodiment of the invention provides a method 70 of selecting an optical signal power for an optical signal carrying traffic encoded on the optical signal in a modulation format. The steps of the method 70 of this embodiment are shown in FIG. 6. The method 70 of this embodiment is similar to the method 60 of FIG. 5, with the following modifications. The same reference numbers are retained for corresponding steps.

In this embodiment, the correction factor is applied to the selected optical signal power 72.

Figure 7:
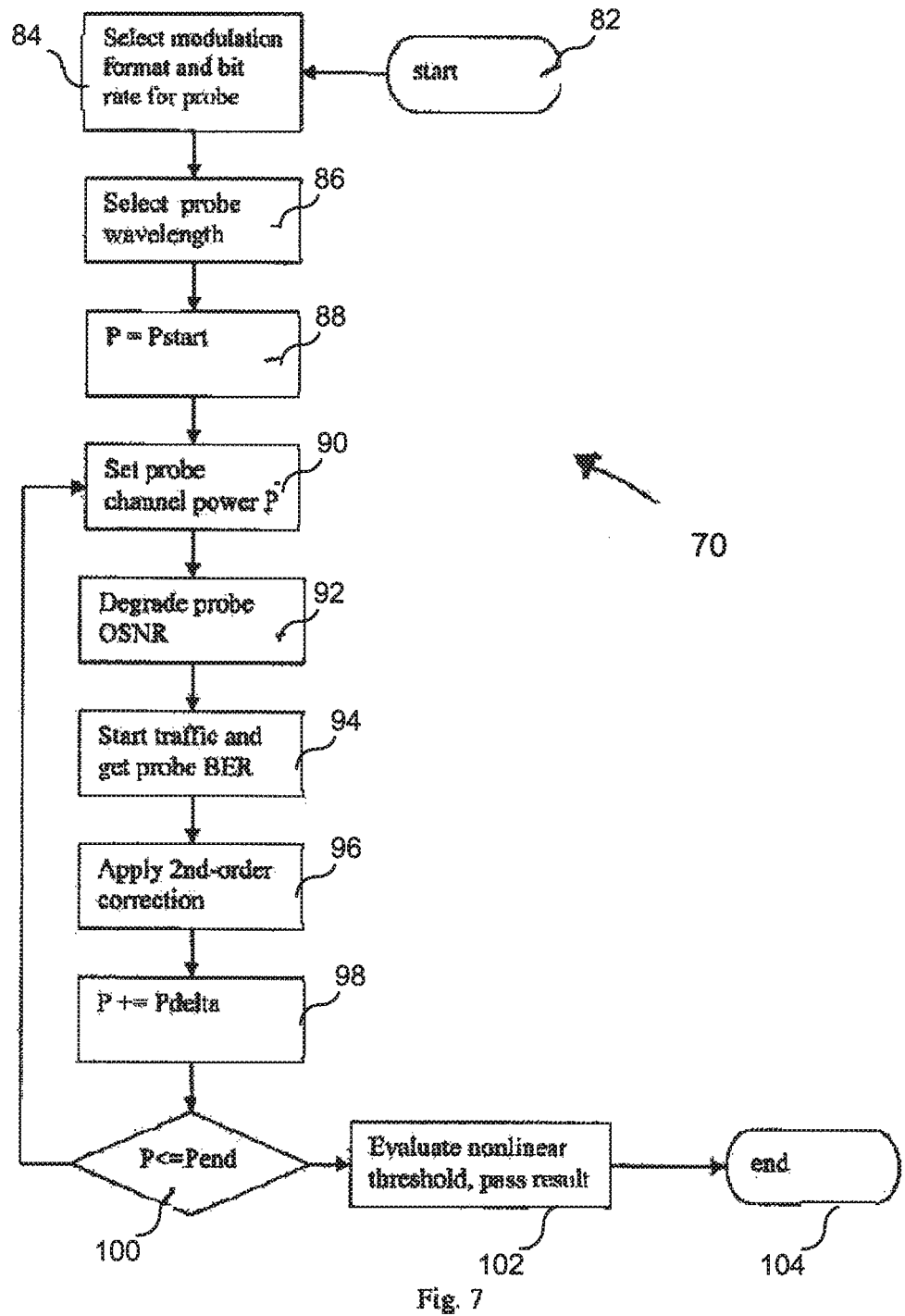
FIG. 7 is a flow chart of the steps of a method of selecting an optical signal power for an optical signal carrying traffic encoded on the optical signal in a modulation format, according to a seventh embodiment of the invention.

A seventh embodiment of the invention provides a method 80 of selecting an optical signal power for an optical signal carrying traffic encoded on the optical signal in a modulation format. Steps of the method 80 are shown in FIG. 7.

The method 80 comprises selecting a modulation format and a bit rate for a probe optical signal 84 and selecting a wavelength for the probe optical signal 86. A starting probe signal power (Pstart) is selected 88 and the probe signal power is set to the starting optical power 90. The probe optical signal OSNR is degraded 92 by adding a noise signal to the probe optical signal. Traffic is then applied to the probe optical signal and the probe optical signal is transmitted across an optical path of an optical communications system 94. Following transmission, the BER of the probe optical signal is measured 94 and a second order correction is applied to the probe optical signal power 96 by obtaining an appropriate correction factor from a look up table and applying the correction factor to the probe optical signal power.

The probe optical signal power is then incremented by an amount Pdelta 98 and the steps of setting the probe optical signal power 90, degrading the probe optical signal OSNR 92, applying traffic and transmitting the probe optical signal and measuring the BER 94, and applying the second order correction 96 are repeated until the probe optical signal power reaches a final power value Pend 100. An indicator value corresponding to a quality above a threshold quality is selected and an optical signal power equal to the respective probe signal power is selected as the optical signal power for the optical signal.

Figure 8:
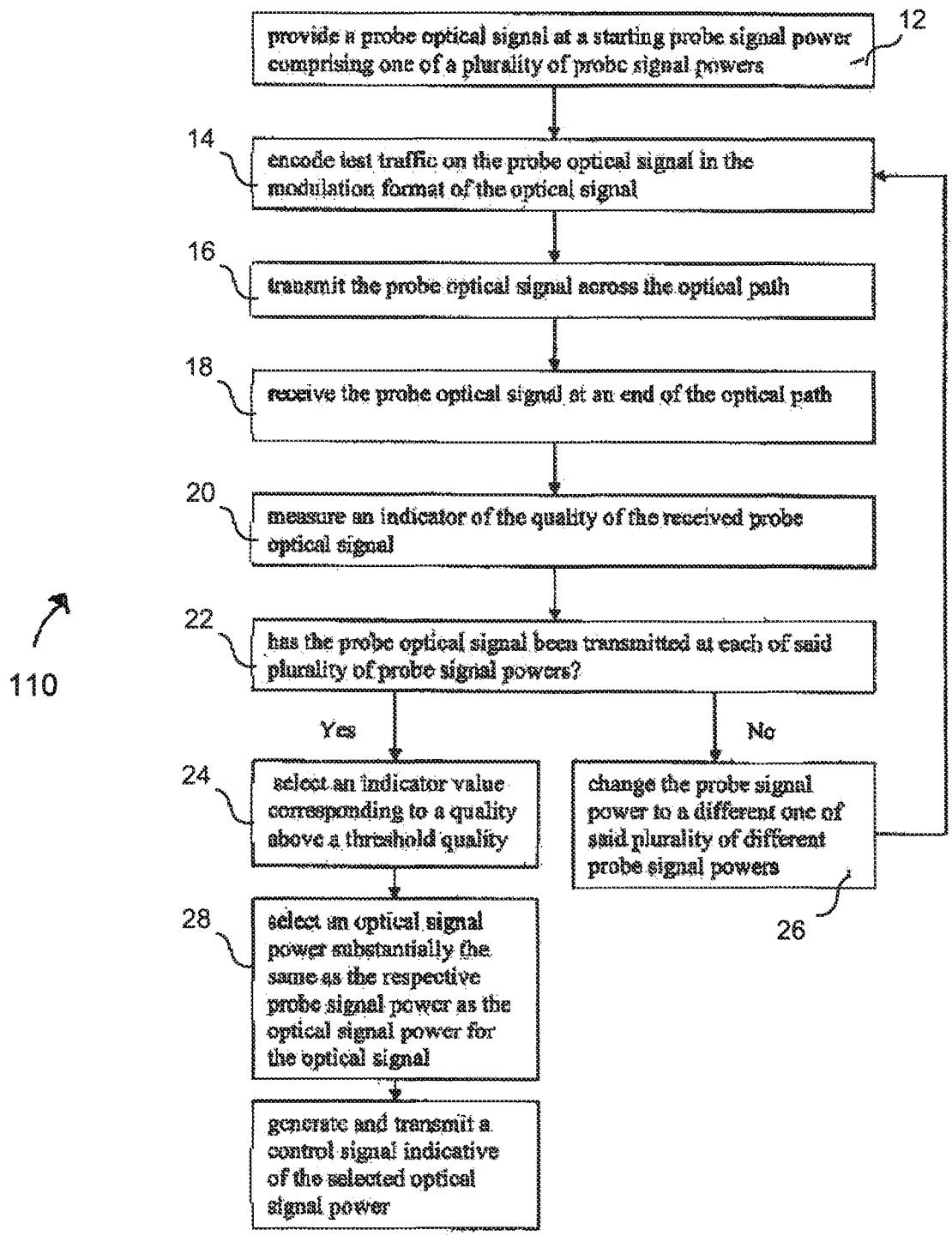
FIG. 8 is a flow chart of the steps of a method of selecting an optical signal power for an optical signal carrying traffic encoded on the optical signal in a modulation format, according to an eighth embodiment of the invention.

Referring to FIG. 8, an eighth embodiment of the invention provides a method 110 of controlling an optical signal power for an optical signal carrying traffic encoded on the optical signal in a modulation format. The optical signal is to be transmitted across an optical path in an optical communications system. The method 110 comprises:

selecting an optical signal power for the optical signal using the method 10, 30, 40, 50, 60, 70 of setting an optical signal power according to any of the previous embodiments; and generating and transmitting a control signal indicative of the selected optical signal power 112.

Figure 9:
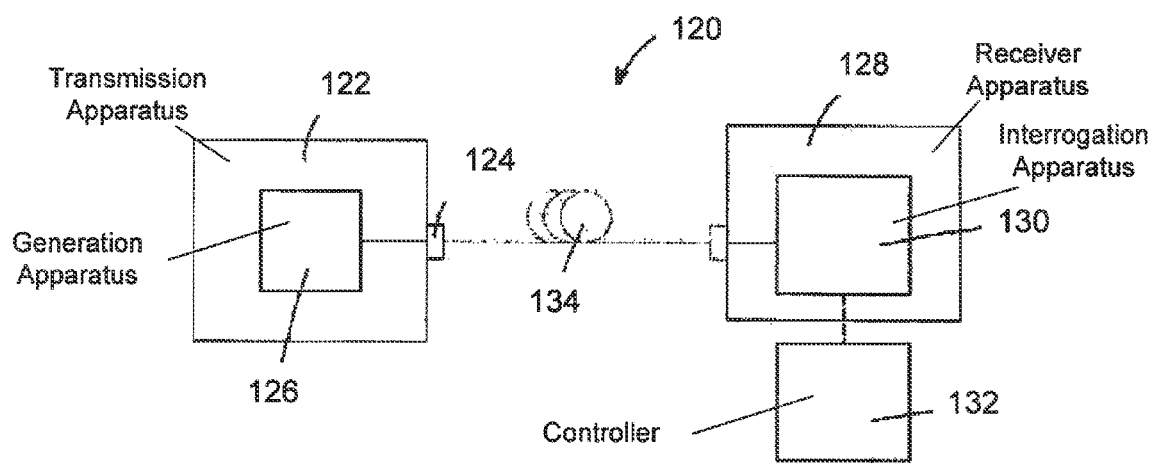
FIG. 9 is a schematic representation of an optical signal power selection system according to a ninth embodiment of the invention.

A ninth embodiment of the invention provides an optical signal power selection system 120 as shown in FIG. 9. The optical signal power selection system 120 comprises probe optical signal transmission apparatus 122, probe optical signal receiver apparatus 128 and a controller 132.

The probe optical signal transmission apparatus 122 comprises an optical output 124 and probe optical signal generation apparatus 126. The optical output 124 is arranged to deliver a probe optical signal to an optical path 134 of an optical communication system. The optical path 134 and the optical communication system do not form part of this embodiment and are shown for illustrative purposes only. The optical path 134 is arranged for transmission of an optical signal carrying traffic encoded thereon in a selected modulation format.

The probe optical signal generation apparatus 126 is arranged to provide a probe optical signal to the optical output. The probe optical signal generation apparatus 126 is arranged to provide a probe optical signal at each of a plurality of different probe signal powers. The probe optical signal carries test traffic encoded on it in the same modulation format as is to be used with the optical signal.

The probe optical signal receiver apparatus 128 comprises probe optical signal interrogation apparatus 130 arranged to receive the probe optical signal following transmission over the optical path 134. The probe optical signal interrogation apparatus 130 is further arranged to measure an indicator of the quality of the received probe optical signal at each of the probe signal powers.

The controller 132 is arranged to receive each measured indicator value and to select an indicator value corresponding to a quality above a pre-selected threshold quality. The controller 132 is further arranged to select an optical signal power for the optical signal which is substantially the same as the probe signal power of the selected indicator value.

A tenth embodiment of the invention provides an optical signal power selection system which is similar to the system 120 of FIG. 9, with the following modifications. This embodiment will be described with reference to FIG. 9 and the same reference numbers are retained for corresponding features.

The optical path 134 is arranged for transmission of an optical signal carrying traffic encoded at a first bit rate. The probe optical signal generation apparatus 126 is arranged to encode test traffic on the probe optical signal at a second bit rate, lower than the bit rate to be used for the optical signal.

Figure 10:
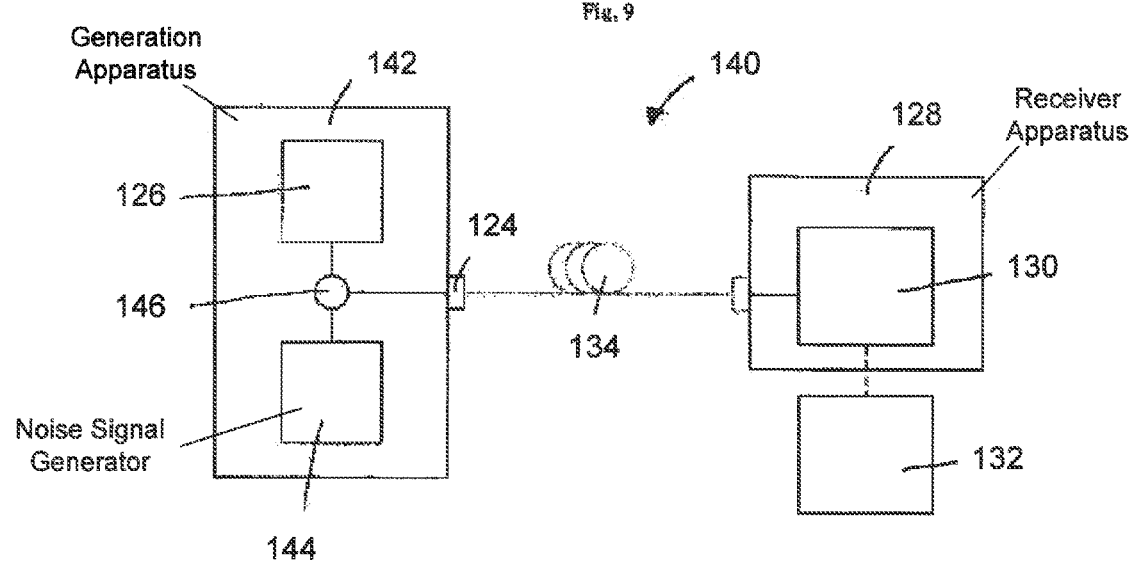
FIG. 10 is a schematic representation of an optical signal power selection system according to a tenth embodiment of the invention.

An optical signal power selection system 140 according to an eleventh embodiment of the invention is shown in FIG. 10. The system 140 of this embodiment is similar to the system 120 of FIG. 9, with the following modifications. The same reference numbers are retained for corresponding features.

The probe optical signal has an optical signal to noise ratio (OSNR). In this embodiment, the probe optical signal generation apparatus 142 further comprises a noise signal generator 144 arranged to generate a noise signal. The noise signal is arranged to reduce the OSNR of the probe optical signal. The probe optical signal generation apparatus 142 is arranged to apply the noise signal to the probe optical signal, in this example by means of an optical mixer or coupler 146. The noise signal is applied to the probe optical signal prior to providing the probe optical signal to the optical output 124, such that the noise is applied to the probe optical signal prior to transmission across the optical path 134.

Optical signals which carry traffic have a bit error rate (BER). The noise signal is added to the probe optical signal in order to give the probe optical signal the same reference BER as the optical signal is expected to have. A reference BER will be understood to mean the BER level that can be properly corrected for in a communications system using forward error correction (FEC). In this embodiment, the reference BER is set to $10^{-3}$. Propagation penalties suffered by an optical signal during transmission are usually higher for lower BER. Modifying the OSNR of the probe optical signal to have the same BER as the optical signal is advantageous because it enables the propagation penalties suffered by the probe optical signal to more closely match those expected to be suffered by the optical signal, so that the indicator of quality measured on the probe optical signal more accurately reflects that which would be measured on the optical signal.

Adding a noise signal is also advantageous in that it makes error counting on the probe signal practical. If the probe optical signal OSNR was not intentionally degraded by optical noise, error counting could be unfeasible because the BER would be orders of magnitude lower thanks to reduced bit-rate and the time necessary to make a statistically meaningful BER estimate would be impractically long. Example for an ideal DP-QPSK modulation format with differential encoding, a BER of $10^{-3}$ is obtained for an OSNR of 14.4 dB at a bit rate of 125.6 Gbit/s. The same OSNR corresponds to a BER of $10^{-29}$ for a bit rate of 10.7 Gbit/s. At this BER it would take minutes or hours to make an estimate of the BER.

In this embodiment, the noise signal is arranged to reduce the OSNR of the probe optical signal in dependence on a ratio of the bit rate of the optical signal, $R_{traffic}$, to the bit rate of the probe optical signal, $R_{probe}$. The desired OSNR reduction, M, to be induced by the addition of noise is given by:

$$M = 10 \cdot \log \frac{R_{signal}}{R_{probe}}$$

Figure 11:
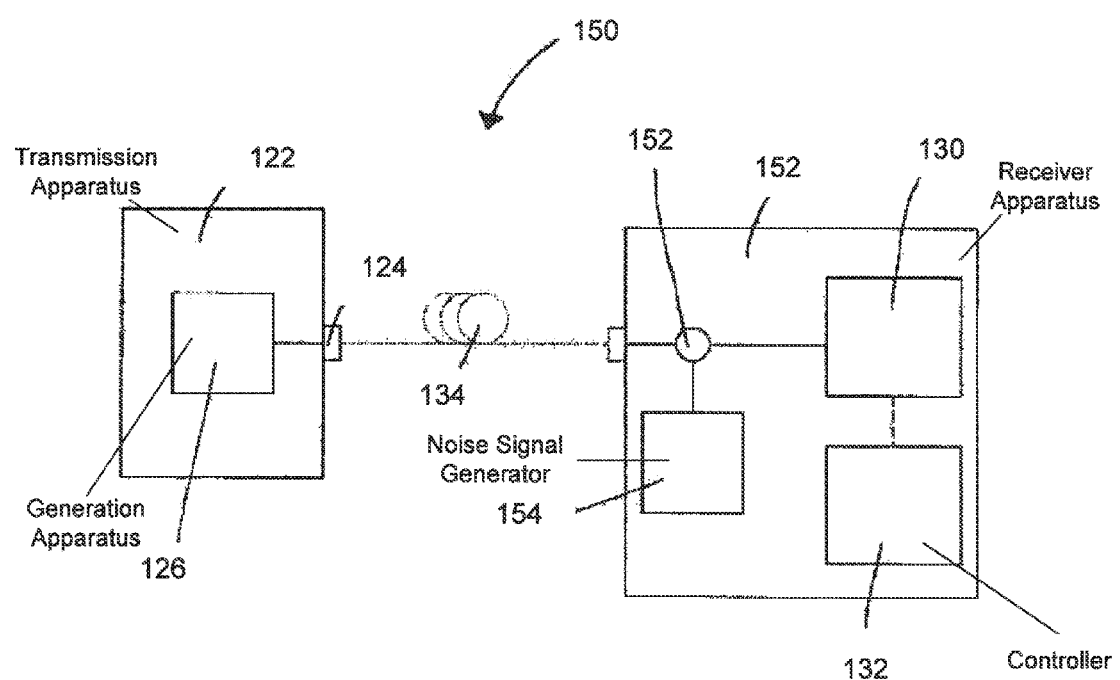
FIG. 11 is a schematic representation of an optical signal power selection system according to a twelfth embodiment of the invention.

An optical signal power selection system 150 according to a twelfth embodiment of the invention is shown in FIG. 11. The system 150 of this embodiment is similar to the system 140 of FIG. 10, with the following modifications. The same reference numbers are retained for corresponding features.

In this embodiment, the controller 132 is provided within the probe optical signal receiver apparatus 152 and a noise signal generator 154 is provided within the probe optical signal receiver apparatus. The noise signal generator 154 is arranged to generate a noise signal arranged to reduce the OSNR of the probe optical signal, as described above. In this embodiment the noise signal is added to the probe optical signal following transmission across the optical path 134, by means of an optical mixer or coupler 156.

When an optical communications system is operating in a linear regime, adding the optical noise at the transmit side or receive side has the same effect. When operating in a nonlinear regime, signal/noise interaction may be different depending on whether the noise signal is added at the transmit side or the receive side because of nonlinear mixing between the probe optical signal and the noise signal.

A thirteenth embodiment of the invention provides an optical signal power selection system which is similar to the system of FIG. 10 and will be described with reference to FIG. 10. In this embodiment the probe optical signal interrogation apparatus 130 is further arranged to obtain an optical signal power correction factor for each probe signal power. The optical signal power correction factor is dependent on the respective measured indicator value for each probe signal power. The probe optical signal interrogation apparatus 130 is further arranged to calculate a corrected probe signal power comprising the probe signal power modified by the correction factor. The controller 132 is arranged to select an indicator value corresponding to a quality above a pre-selected threshold quality and to select as the optical signal power for the optical signal the corrected probe signal power corresponding to the selected indicator value.

The addition of a noise signal, as shown in FIGS. 10 and 11, may be regarded as a first-order correction to the selected optical signal power. Applying a correction factor takes into account deviations in the optical signal power selected due to known effects, like oscillator phase noise, quantization errors, which affect the probe optical signal during transmission across the optical path 134. While these effects can be corrected for using known algorithms following receipt of an optical signal, these algorithms perform better at lower bit rates, and therefore perform better on the probe optical signal than on the optical signal to be transmitted. Applying the correction factor takes the poorer performance of the algorithms on the optical signal into account.

The correction factor may be obtained from a look-up table provided within the controller 132 which contains a respective correction factor for each measured indicator value. A different set of correction factors may be provided for each modulation format which may be used, since the propagation penalties suffered by an optical signal depend upon the modulation format.

Alternatively, the probe optical signal power can be corrected by arranging the controller 132 to apply a correction factor in the form of an algorithm provided within the controller. The algorithm may be obtained by plotting theoretically modelled values of optimal optical signal power against optimal probe signal power. The modelled optimal optical signal power is the optical signal power having the lowest BER or highest effective Q-factor for a selected optical path across an optical communications system, taking into account propagation penalties for the path. The optimal probe signal power is modelled by applying the method of the present invention to identify the indicator value corresponding to the highest quality and selecting the corresponding probe signal power, which does not take into account propagation penalties of the path. The algorithm is then obtained by applying a best-fit polynomial to the plotted values, and gives an indication of whether the optical signal power selected using the method of the present invention is an over estimate or an underestimate of the optimal optical signal power. Applying the algorithm to probe signal powers corrects for any such over or under estimation of the optical signal power.

A fourteenth embodiment of the invention provides an optical signal power selection system which is similar to the previous embodiment and will be described with reference to FIG. 10. The same reference numbers are retained for corresponding features.

In this embodiment the controller 132 is arranged, following selection of the optical signal power, to obtain and optical signal power correction factor. The correction factor depends on the respective measured indicator value corresponding to the selected optical signal power. The controller 132 is arranged to calculate a corrected optical signal power comprising the selected optical signal power modified by the correction factor.

Figure 12:
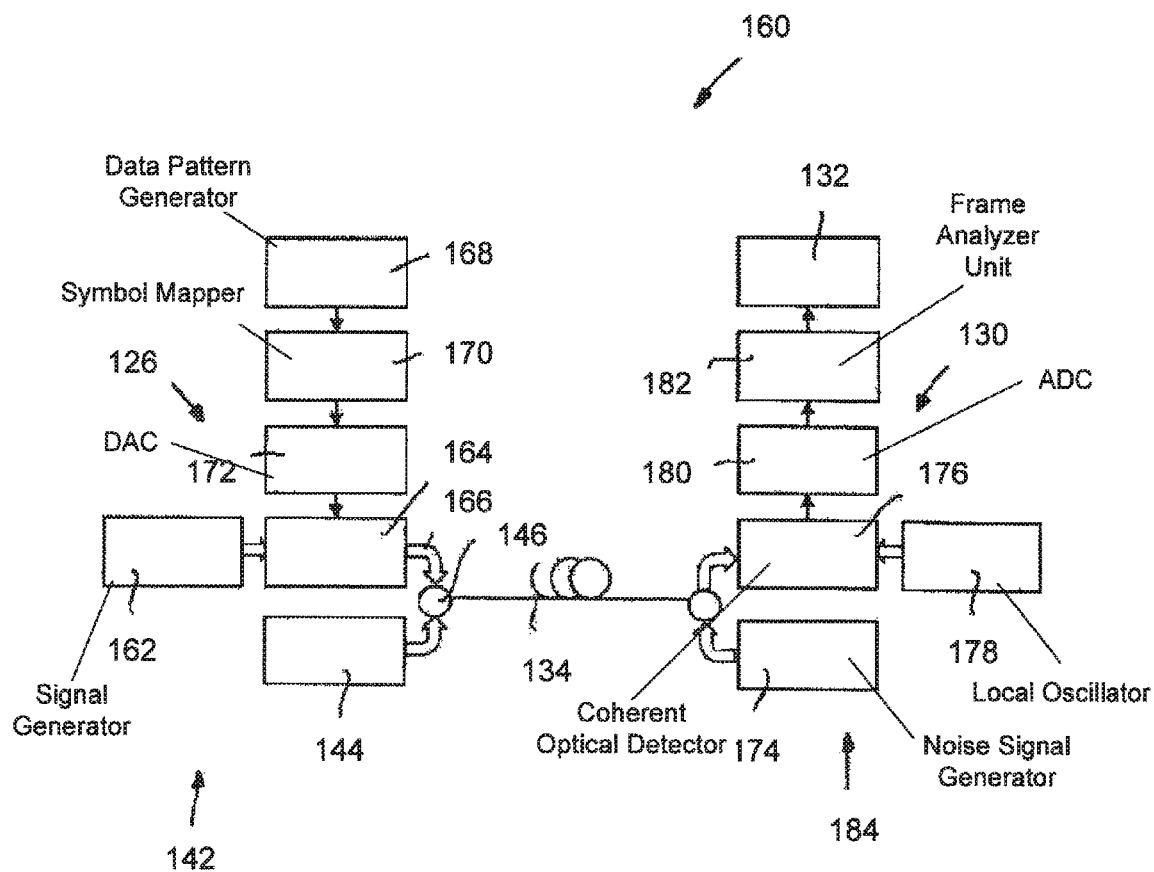
FIG. 12 is a schematic representation of an optical signal power selection system according to a fifteenth embodiment of the invention.

A fifteenth embodiment of the invention provides an optical signal power selection system 160 as shown in FIG. 12. The system 160 of this embodiment is similar to the system 140 of FIG. 10, with the following modifications. The same reference numbers are retained for corresponding features.

The probe optical signal generation apparatus 126 comprises an optical carrier signal generator 162 and an optical modulator 164 arranged to encode traffic onto the optical carrier signal to form the probe optical signal 166. The probe optical signal generation apparatus 126 further comprises a data pattern generator 168, a symbol mapper 170 and a digital to analogue converter 172 which are arranged to drive the modulator 164 to encode traffic onto the probe optical signal 166.

The probe optical signal interrogation apparatus 130 comprises a noise signal generator 174, a coherent optical detector 176 and a local oscillator 178. The operation of a coherent optical detector 176 will be well known to the person skilled in the art and will not be described in detail here. The probe optical signal interrogation apparatus 130 further comprises an analogue to digital converter 180 and a digital signal processor and frame analyser unit 182.

The system 160 may be operated to apply a noise signal to the probe optical signal either prior to transmission across the optical path 134 or following receipt by selectively operating the respective noise signal generation apparatus 144, 174.

Figure 13:
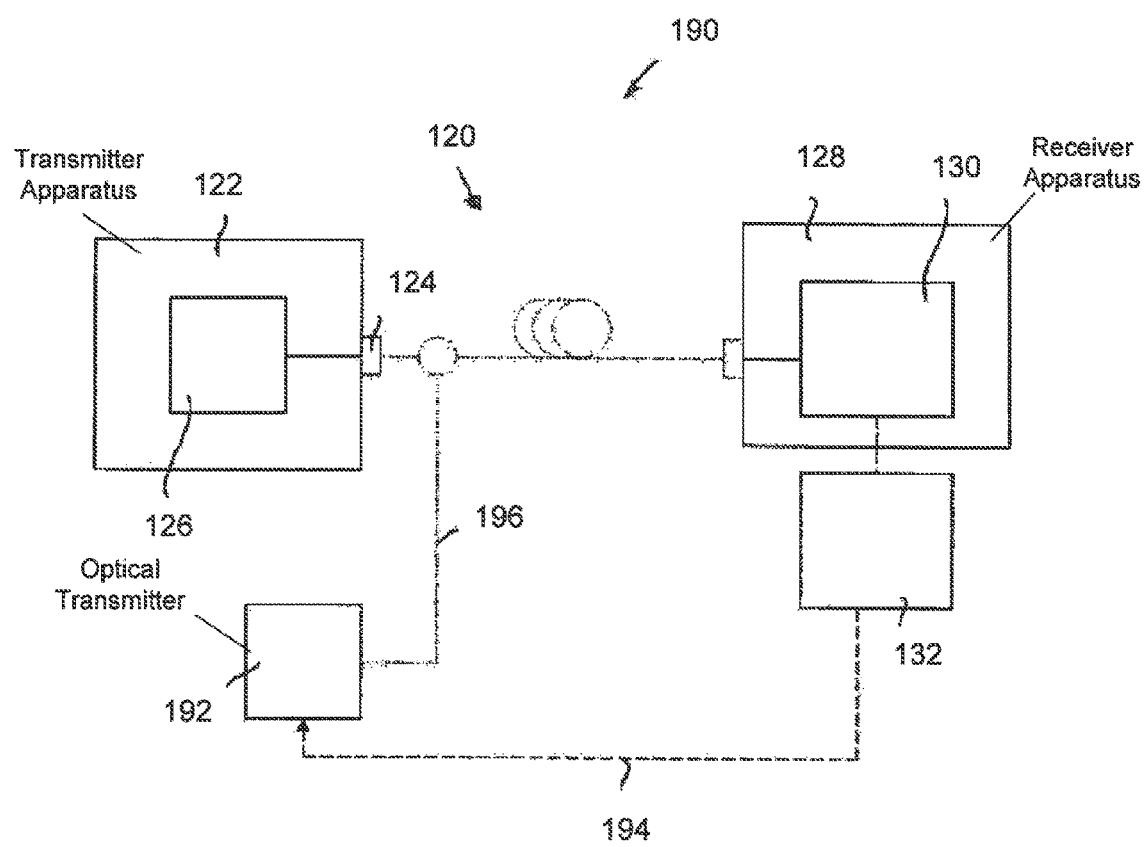
FIG. 13 is a schematic representation of an optical signal power selection system according to a sixteenth embodiment of the invention.
Figure 14:
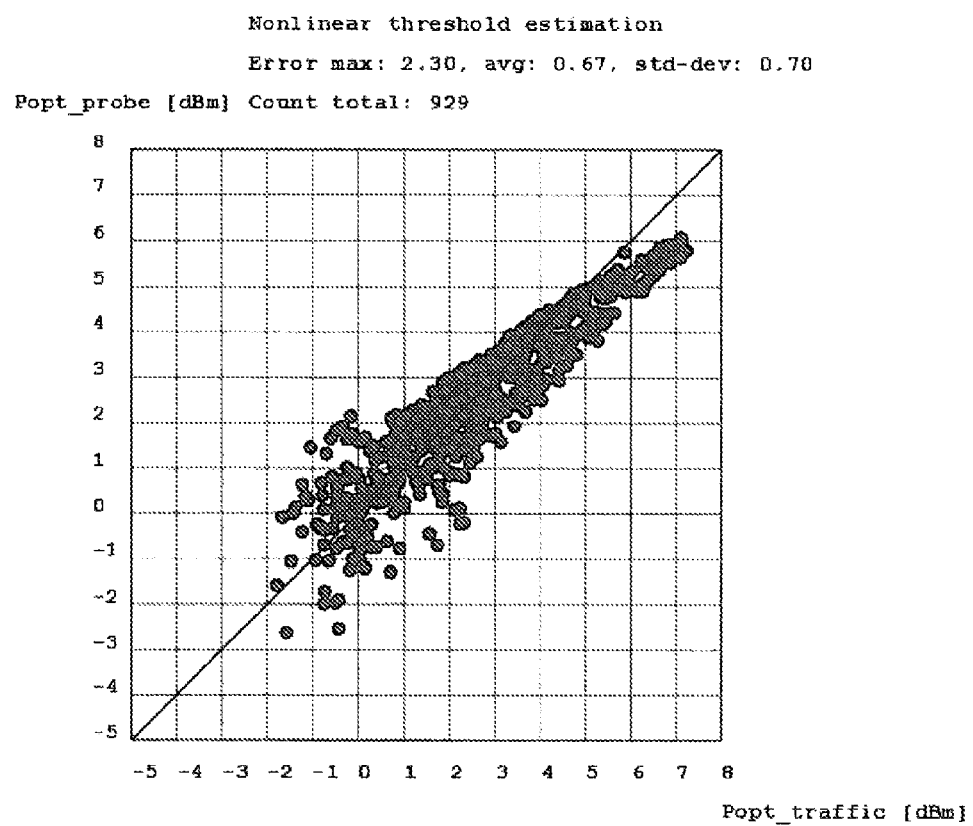
FIG. 14 is a plot of numerical simulation results of optimal probe signal power as a function of optimal optical signal power.

A sixteenth embodiment of the invention provides optical signal transmission apparatus 190 as shown in FIG. 13. The optical signal transmission apparatus 190 comprises an optical signal power selection system 120 as shown in FIG. 9 and an optical transmitter 192.

The controller 132 is further arranged to generate and transmit a control signal 194 indicative of the selected optical signal power.

The optical transmitter 192 is arranged to generate and transmit an optical signal 196 carrying traffic encoded on it in a modulation format. The optical transmitter 192 is further arranged to receive the control signal 194 and to generate and transmit the optical signal 196 at the selected optical signal power.

The seventeenth embodiment of the invention provides a data carrier having computer readable instructions embodied therein. The computer readable instructions being for providing access to resources available on a processor. The computer readable instructions comprising instructions to cause the processor to perform the steps of any of the methods 10, 30, 40, 50, 60, 70, 80, 110 of selecting an optical signal power for an optical signal carrying traffic encoded on the optical signal in a modulation format, as described in the above embodiments.

The invention claimed is:

1. A method of selecting an optical signal power for an optical signal carrying traffic encoded on the optical signal in a modulation format, the optical signal to be transmitted across an optical path in an optical communications system, the method comprising:
   a. providing a probe optical signal at a probe signal power, the probe optical signal carrying test traffic encoded on the probe optical signal in said modulation format;
   b. transmitting the probe optical signal across the optical path; and
   c. receiving the probe optical signal at an end of the optical path and measuring a quality indicator corresponding to the probe optical signal,
   wherein the method comprises implementing steps a. to c. for each of a plurality of different probe signal powers and the method further comprises selecting one of said plurality of probe optical signals based on the measured quality indicators corresponding to the probe optical signals and selecting as the optical signal power for the optical signal an optical signal power substantially the same as the probe signal power of the selected probe optical signal power,
   wherein said one of the probe optical signals has an optical signal to noise ratio and the method further comprises adding a noise signal to said one of the probe optical signals, the noise signal being arranged to reduce the optical signal to noise ratio, and
   wherein traffic is encoded on the optical signal at a first bit rate, and test traffic is encoded on one of the plurality of probe optical at a second, lower bit rate.

2. The method as claimed in claim 1, wherein the noise signal is arranged to reduce the optical signal to noise ratio in dependence on a ratio of the first bit rate to the second bit rate.

3. The method as claimed in claim 1, wherein for each probe signal power the method further comprises step d. comprising obtaining an optical signal power correction factor in dependence on the respective measured quality indicator value and calculating a corrected probe signal power comprising the probe signal power modified by the correction factor, wherein the optical signal power for the optical signal is selected by selecting a quality indicator value corresponding to a quality above a threshold quality and selecting an optical signal power substantially the same as the respective corrected probe signal power as the optical signal power for the optical signal.

4. The method as claimed in claim 1, wherein the method further comprises obtaining an optical signal power correction factor for the optical signal power, the optical signal power correction factor depending on the respective measured quality indicator value, and the method further comprising calculating a corrected optical signal power comprising the optical signal power modified by the correction factor.

5. The method as claimed in claim 1, wherein the quality indicator value corresponding to the highest quality is selected.

6. The method as claimed in claim 1, further comprising generating and transmitting a control signal indicative of the selected optical signal power.

7. The method as claimed in claim 6, wherein the method further comprises receiving said control signal and transmitting an optical signal at the selected optical signal power.

8. The method of claim 1, wherein the noise signal is arranged to reduce the optical signal to noise ratio based on a ratio of a bit rate of the optical signal carrying traffic ($R_{signal}$) to a ratio of a bit rate of the probe optical signal ($R_{probe}$).

9. The method of claim 8, wherein the reduction of the optical signal to noise ratio is defined by:

$$M = 10 \cdot \log \frac{R_{signal}}{R_{probe}}.$$

10. The method as claimed in claim 1, wherein the noise signal is arranged to reduce the optical signal to noise ratio in dependence on a ratio of a bit rate of the traffic encoded on the optical signal and a bit rate of the test traffic.

11. The method of claim 1, wherein the optical communication system includes an optical transmitter that is configured to generate the probe optical signals at the plurality of different probe signal powers.

12. An optical signal power selection system comprising:
   a probe optical signal transmission apparatus comprising:
      an optical output arranged to deliver a probe optical signal to an optical path of an optical communications system, the optical path being arranged for transmission of an optical signal carrying traffic encoded on the optical signal in a modulation format; and
      a probe optical signal generation apparatus arranged to provide a probe optical signal to the optical output, the probe optical signal generation apparatus being further arranged to provide the probe optical signal at each of a plurality of different probe signal powers, the probe optical signal carrying test traffic encoded on said probe optical signal in said modulation format;
   a probe optical signal receiver apparatus comprising: probe optical signal interrogation apparatus arranged to receive the probe optical signal following transmission over the optical path and further arranged to measure an indicator of the quality of the received probe optical signal at each said probe signal power; and
   a controller arranged to: receive each measured indicator value; select an indicator value corresponding to a quality above a threshold quality; and select as the optical signal power for the optical signal an optical signal power substantially the same as the probe signal power that corresponds to the selected indicator value,
   wherein the probe optical signal has an optical signal to noise ratio and the probe optical signal generation apparatus comprises a noise signal generator arranged to generate a noise signal arranged to reduce the optical signal to noise ratio and the probe optical signal generation apparatus is further arranged to apply the noise signal to the probe optical signal prior to providing the probe optical signal to the optical output,
   wherein the optical path is arranged for transmission of an optical signal carrying traffic encoded at a first bit rate, and the probe optical signal generation apparatus is arranged to encode test traffic on the probe optical signal at a second, lower bit rate.

13. The optical signal power selection system as claimed in claim 12, wherein the probe optical signal has an optical signal to noise ratio and the probe optical signal receiver apparatus comprises a noise signal generator arranged to generate a noise signal arranged to reduce the optical signal to noise ratio and the probe optical signal receiver apparatus is further arranged to apply the noise signal to the received probe optical signal prior to measuring the indicator of the quality of the received probe optical signal for each said probe signal power.

14. The optical signal power selection system as claimed in claim 12, wherein the noise signal is arranged to reduce the optical signal to noise ratio in dependence on a ratio of the first bit rate to the second bit rate.

15. The optical signal power selection system as claimed in claim 12, wherein the probe optical signal interrogation apparatus is further arranged to, for each probe signal power, obtain an optical signal power correction factor in dependence on the respective measured indicator value and calculate a corrected probe signal power comprising the probe signal power modified by the correction factor, and the controller is arranged to select the optical signal power for the optical signal by selecting an indicator value corresponding to a quality above the threshold quality and selecting an optical signal power substantially the same as the respective corrected probe signal power as the optical signal power for the optical signal.

16. The optical signal power selection system as claimed in claim 12, wherein the probe optical signal interrogation apparatus is arranged to select the indicator value corresponding to the highest quality.

17. The optical signal power selection system as claimed in claim 12, wherein the controller is further arranged to obtain an optical signal power correction factor in dependence on the respective measured indicator value and calculate a corrected optical signal power comprising the optical signal power modified by the correction factor.

18. An optical signal transmission apparatus comprising:

an optical signal power selection system as claimed in claim 12, wherein the controller is further arranged to generate and transmit a control signal indicative of the selected optical signal power; and an optical transmitter arranged to generate and transmit an optical signal carrying traffic encoded on the optical signal in a modulation format, the optical transmitter further being arranged to receive said control signal and to generate and transmit the optical signal at the selected optical signal power.

* * * * *